C. SHAEFFER.
ANIMAL TRAP.
APPLICATION FILED MAY 18, 1910.
968,273.
Patented Aug. 23, 1910.
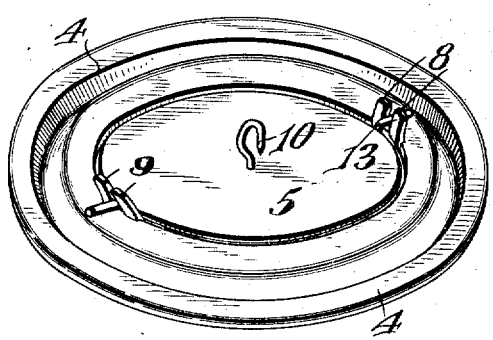
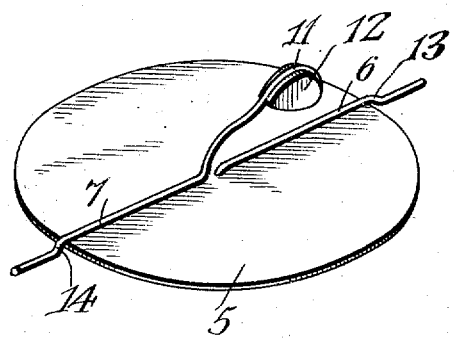
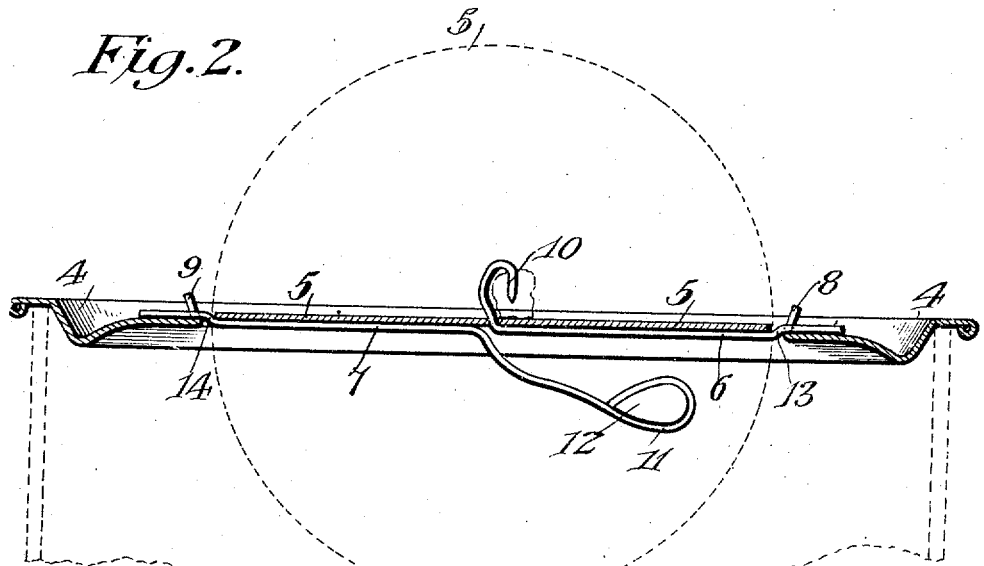
Witnesses
Jas. F. McCathran
H. F. Totten
Inventor
Charles Shaeffer,
By E. G. Siggers
Attorney

UNITED STATES PATENT OFFICE.

CHARLES SHAEFFER, OF PARIS, TEXAS.

ANIMAL-TRAP.

968,273.  Specification of Letters Patent.  Patented Aug. 23, 1910.

Application filed May 18, 1910. Serial No. 562,018.

*To all whom it may concern:*

Be it known that I, CHARLES SHAEFFER, a citizen of the United States, residing at Paris, in the county of Lamar and State of Texas, have invented a new and useful Animal-Trap, of which the following is a specification.

This invention relates to animal traps, and particularly to that class of traps which are placed over a receptacle to confine the animal after the trap is sprung.

One of the objects of my invention is to provide a trap which has the bait arranged on a tilting-table, so as the animals advance toward the bait, the table is tilted by their weight, and they fall through the trap into any suitable receptacle for confining or drowning them.

Another object of my invention is to provide a trap which when sprung will automatically reset itself.

With these and other objects in view, which will appear as the nature of the invention is better understood, the invention consists in certain novel features of construction, as hereinafter fully described and finally recited in the appended claims.

In the accompanying drawing:—Figure 1 is a perspective view of the trap. Fig. 2 is a longitudinal sectional view of the trap on an enlarged scale applied to a receptacle. Fig. 3 is a perspective view of the tilting-table or disk inverted.

Similar reference letters refer to similar parts throughout the several views.

In the drawing 4 represents a frame of any suitable material and shape, which is supported upon the upper edge of a suitable receptacle, as shown in Fig. 2. The frame is shown as circular and has a circular hole cut therefrom leaving a marginal circular rim or band. Pivotally mounted in the opening of said frame is a disk or trip plate 5, which is of the same configuration as the opening in said frame, but a trifle smaller in size, thus allowing said disk or trip plate to trip when weight is applied to any part of the surface thereof not lying in the axis. Suitably attached, as by solder, to the underside of the trip plate, and extending diametrically across the same, are rods or wires 6 and 7, the outer ends of which extend beyond the edge of the trip plate and are adapted to pivot in bearings 8 and 9 arranged at and upstanding from the inner peripheral edge of the frame 4. The inner end of the rod or wire 6 extends upwardly through an opening in the center of the trip plate 5 and terminates at its extreme inner end in a bait hook 10, which is adapted to engage the bait and hold the same on said trip plate. The rod or wire 7 is provided at its inner end with a downwardly bent portion terminating in a loop 11, which encircles a weight 12, the tendency of which is to keep said trip plate in a horizontal position. The part of the rods or wires 6 and 7 immediately beyond the edge of the trip plate are bent upwardly as at 13 and 14 in the horizontal plane of said plate, thus permitting the top of the trip plate to be approximately in a plane with that portion of the frame upon which the said rods rest.

From the foregoing it will readily be seen that when the trap is set and baited and an animal attempts to reach the bait in the center of the trip plate, the weight of the animal will tilt the said plate and the animal will be precipitated through the hole into the receptacle beneath said trap. As soon as the weight of the animal is off said trip plate, the action of the weight will be such as to set the trap with the bait side up, as before.

Having thus described the invention, what is claimed is:—

1. In an animal trap, the combination of a frame, a trip plate pivotally mounted in an opening of said frame, and pivot rods carried by said trip plate and adapted to fit in bearings on said frame, one of said pivot rods being extended upwardly through the trip plate and providing bait holding means and the other being extended under the trip plate and providing a weighted member for keeping said plate in operative position.

2. In an animal trap, the combination with a frame, and a trip plate pivotally mounted in an opening of said frame, pivot rods extending diametrically across and attached to the under side of said plate and adapted to fit in bearings provided on said frame, one of said rods extending upwardly through the center of said trip plate and furnishing a bait attaching means, and the other rod extending downwardly and provided with a weight for setting said plate in operative position.

3. In an animal trap, the combination of a frame, a trip plate pivotally mounted in an opening of the frame, and pivot members attached to and extending diametrically across the underside of said trip plate, the outer ends of said pivots projecting beyond the edge of said trip plate and adapted to fit in bearings on the inner peripheral edge of said frame, the inner end of one of said pivot members extending upwardly through the center of said trip plate and terminating in a hook for holding the bait, the inner end of the other pivot member extending downwardly and adapted to encircle a weight, said weight adapted to keep said trip plate in horizontal position.

In testimony, that I claim the foregoing as my own, I have hereto affixed my signature in the presence of two witnesses.

CHARLES SHAEFFER.

Witnesses:
T. N. WHITE,
EDWIN MOORE.